F. N. GIBB.
SPRING WHEEL.
APPLICATION FILED OCT. 26, 1907.
934,159.
Patented Sept. 14, 1909.
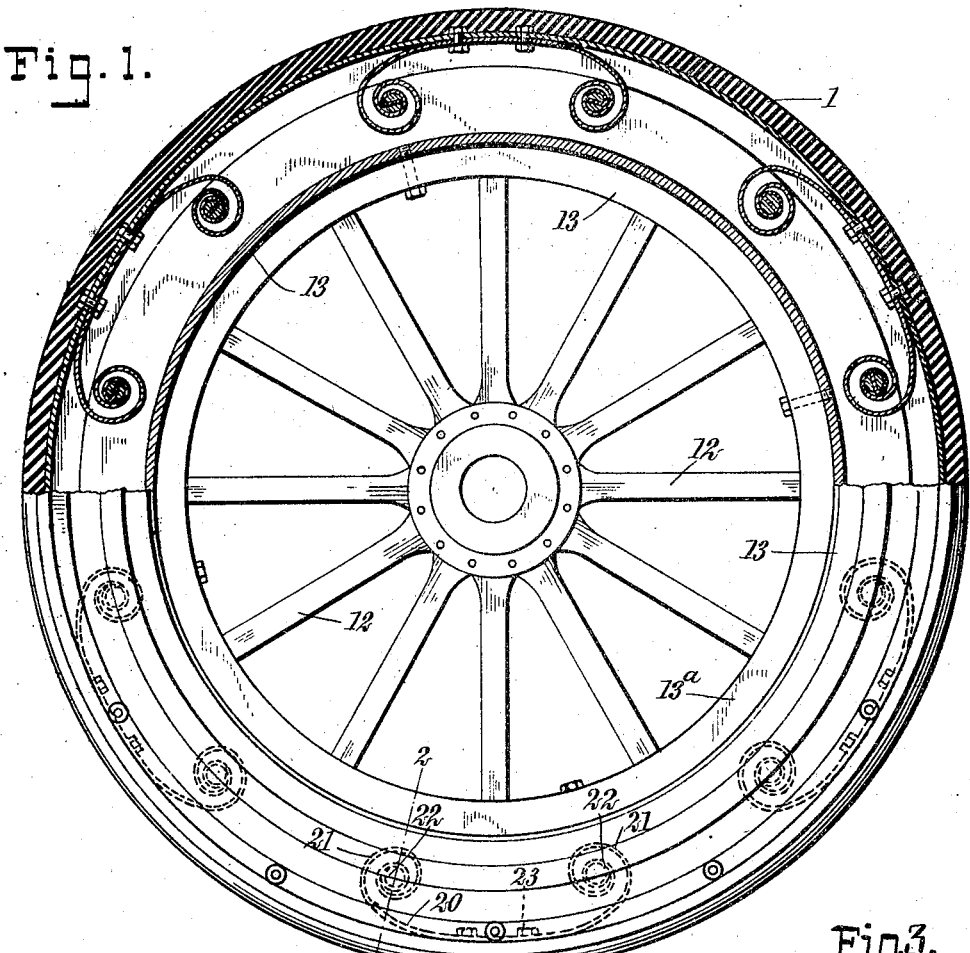
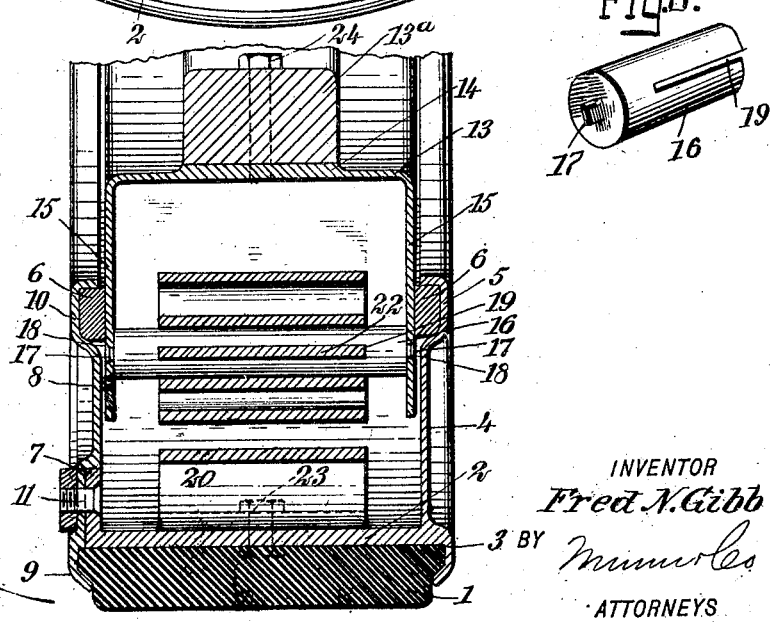
WITNESSES
John H. Lynch
Orsorus Munn
INVENTOR
Fred N. Gibb
BY Munn & Co.
ATTORNEYS

UNITED STATES PATENT OFFICE.

FRED NEWTON GIBB, OF LITTLE ROCK, ARKANSAS.

SPRING-WHEEL.

934,159.

Specification of Letters Patent.   Patented Sept. 14, 1909.

Application filed October 26, 1907. Serial No. 399,361.

*To all whom it may concern:*

Be it known that I, FRED N. GIBB, a citizen of the United States, and a resident of Little Rock, in the county of Pulaski and State of Arkansas, have invented a new and Improved Spring-Wheel, of which the following is a full, clear, and exact description.

This invention relates to vehicle wheels, and more especially wheels of the type known as spring wheels and is especially useful in connection with automobiles, motor trucks and the like.

The object of the invention is to provide a vehicle wheel having resilient means for absorbing shocks from the irregularities of the road, and thus obviate the use of the pneumatic tire and the objections incident to such use.

The invention consists in the construction and combination of parts to be more particularly described hereinafter and particularly set forth in the claims.

Reference is to be had to the accompanying drawings forming a part of this specification, in which similar characters of reference indicate corresponding parts in all of the figures, in which—

Figure 1 is a side elevation of the device showing part in section; and Fig. 2 is a cross section on the line 2—2 of Fig. 1, and Fig. 3 is an enlarged perspective view of the end of one of the supports.

Before proceeding to a more detailed description of my invention, it should be understood that my device obviates the necessity of using pneumatic tires on vehicles and thereby decreases many of the difficulties so common to that type of tire. In general my spring wheel includes an outer and inner rim with resilient means therebetween for absorbing the shocks caused by the irregularities of the road. A rubber tread of any common or preferred form is attached to the outer rim, for increasing the tractive efficiency on roads and pavements and also greatly increasing the resiliency.

Referring more particularly to the drawings, 1 represents the rubber tread, of common or preferred form, of the vehicle wheel and which bears suitable annular ribs on its lateral faces by means of which it may be securely mounted upon a base plate 2, having a suitably disposed flange 3, which engages the annular rib on one face of the rubber tread. A lateral web 4, integral with the base plate and having a portion bent to form a channel or groove 5, for a purpose to be hereinafter described, extends around the wheel. A further lateral flange 7, on the opposite side of the base plate from the flange 3 and lying in a plane substantially parallel to that of the flange 3, extends around the wheel in a similar manner. Removably attached to the flange 7 in any suitable manner, for instance by means of bolts 11, as is shown in Fig. 2, is a side plate 8. The outer rim 9 of the plate 8 is formed similar to the flange 3 and engages the rib on the rubber tread to secure the latter in rigid position. The inner rim of the side member is formed into a groove 10, similar to that of the groove 5 on the opposite side of the wheel.

The spokes 12 of the wheel carry a rim 13$^a$, in any suitable manner. Mounted on the rim by means of bolts or screws 24 which may be of any suitable type is an annular channel member 13, consisting of a base 14 and substantially parallel sides 15. The grooves 10 and 5 serve to contain packing material 6, such as felt, cotton waste, leather, composition packing or the like, which engages the sides 15 and prevents the entrance of water, dirt or other foreign substances liable to interfere with the operation of the device. Mounted between these sides 15 and abutting thereagainst are supports 16, for springs or other resilient connecting means between the rims. Rectangular keys 17, at the opposite ends of the spring supports are mounted in openings 18 of the sides and secure the spring supports rigidly in position. The spring supports have longitudinal slots 19 extending nearly to the ends thereof and for a purpose to be hereinafter stated. Mounted upon the inner face of the base plate 2, and between the sides thereof, are springs 20. These springs may be secured to the base plate at any suitable number of points by means of rivets or bolts 23. The end portions 21 of the springs are formed into inwardly disposed coils, the extremities 22 of which are secured to adjacent spring supports 16, by being arranged in the slots 19.

It will be understood that the springs absorb the shocks at the rim of the wheel, by resiliently resisting the movement of the outer rim of the wheel relative to the inner rim. The springs hold the parts normally in their proper position. Furthermore, the springs permit a certain peripheral movement of the outer rim with respect to the inner rim, so that the jar incident to the sudden starting of the vehicle is largely obviated. To prevent the sides of the channel member from coming in contact with the base plate, the coiled ends of the springs can be made of suitable thickness and width.

Having thus described my invention, I claim as new and desire to secure by Letters Patent:

1. A vehicle wheel comprising an outer and an inner rim, one of said rims having substantially parallel sides, supports mounted between said sides, said supports having slots therein, keys on the ends of said supports, said sides having openings adapted to receive said keys and holding said supports against rotation, resilient connecting means mounted between said outer and said inner rim, the ends of said resilient member being secured in the slots in said supports, and means for securing said resilient means to said other rim.

2. A vehicle wheel, comprising an outer and an inner rim, said inner rim having laterally extended sides, supports mounted between said sides, means for securing said supports against rotation, and resilient connecting means mounted between said outer and said inner rim, the ends of said resilient means being secured to said spring supports.

3. A vehicle wheel, comprising an outer and an inner rim, said inner rim having substantially parallel sides, supports mounted between said sides, said supports having slots therein, keys on the ends of said supports, said sides having openings adapted to receive said keys and holding said supports against rotation, resilient connecting means mounted between said outer and said inner rim, the ends of said resilient means being secured in the slots in said supports, and means for securing said resilient means to said outer rim.

4. A vehicle wheel, comprising an outer and an inner rim, removable means for securing a rubber tread in position upon said outer rim, said inner rim having substantially parallel sides, supports mounted between said sides, keys at the ends of said supports, said sides having openings adapted to receive said keys and secure said supports against rotation, said supports having longitudinal openings therethrough, springs mounted between said outer and inner rim, the ends of said springs being adapted to be securely mounted in said openings of said supports, and means for securing said springs to said outer rim at a plurality of points.

In testimony whereof I have signed my name to this specification in the presence of two subscribing witnesses.

FRED NEWTON GIBB.

Witnesses:
THEO. M. SANDERS,
T. W. HOLSTON.